Oct. 21, 1952        D. L. CALKINS        2,614,375
REVOLVING SPRING TOOTH HARROW
Filed July 12, 1948                              4 Sheets-Sheet 1
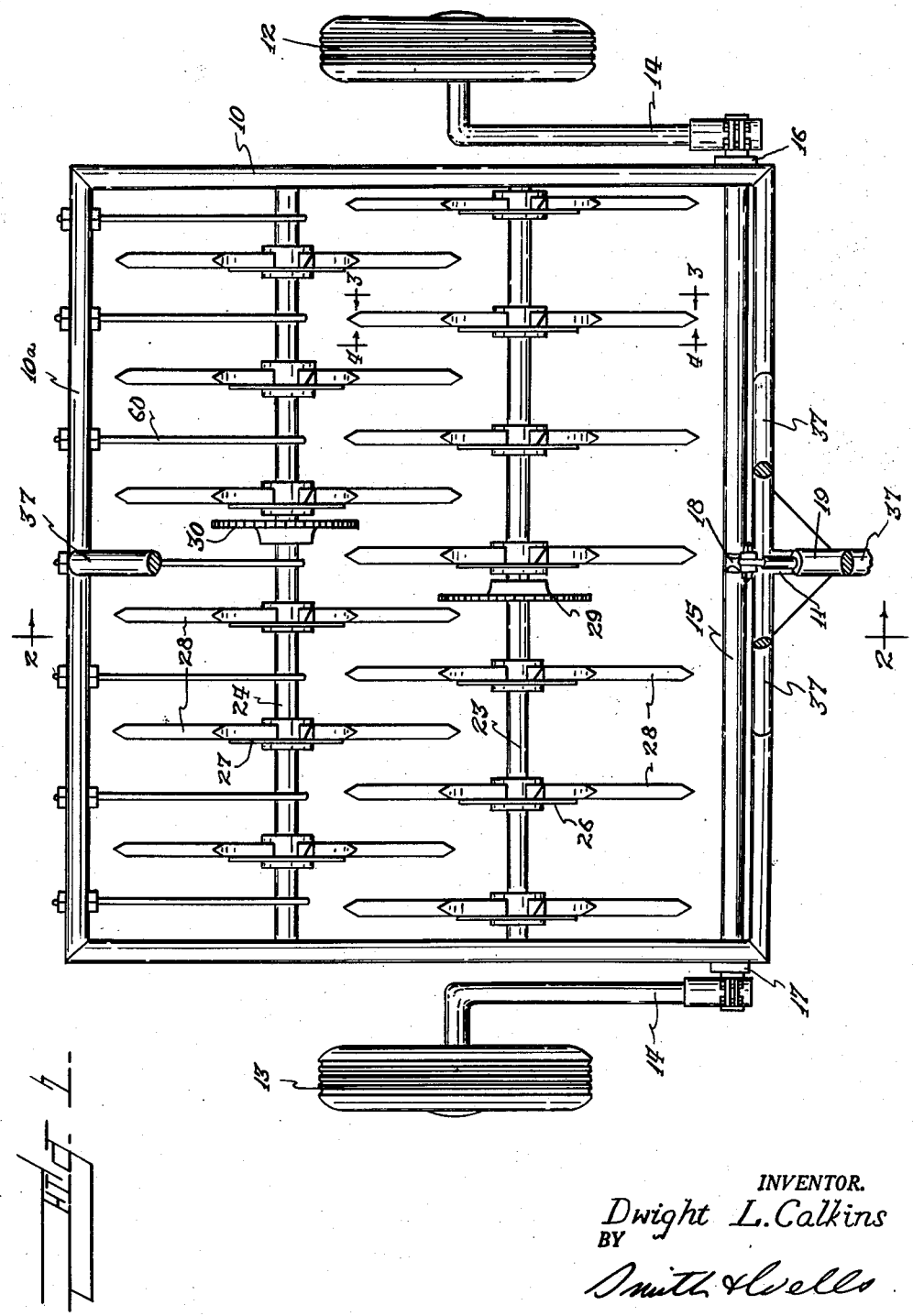
*INVENTOR.*
Dwight L. Calkins
BY
Smith & Wells

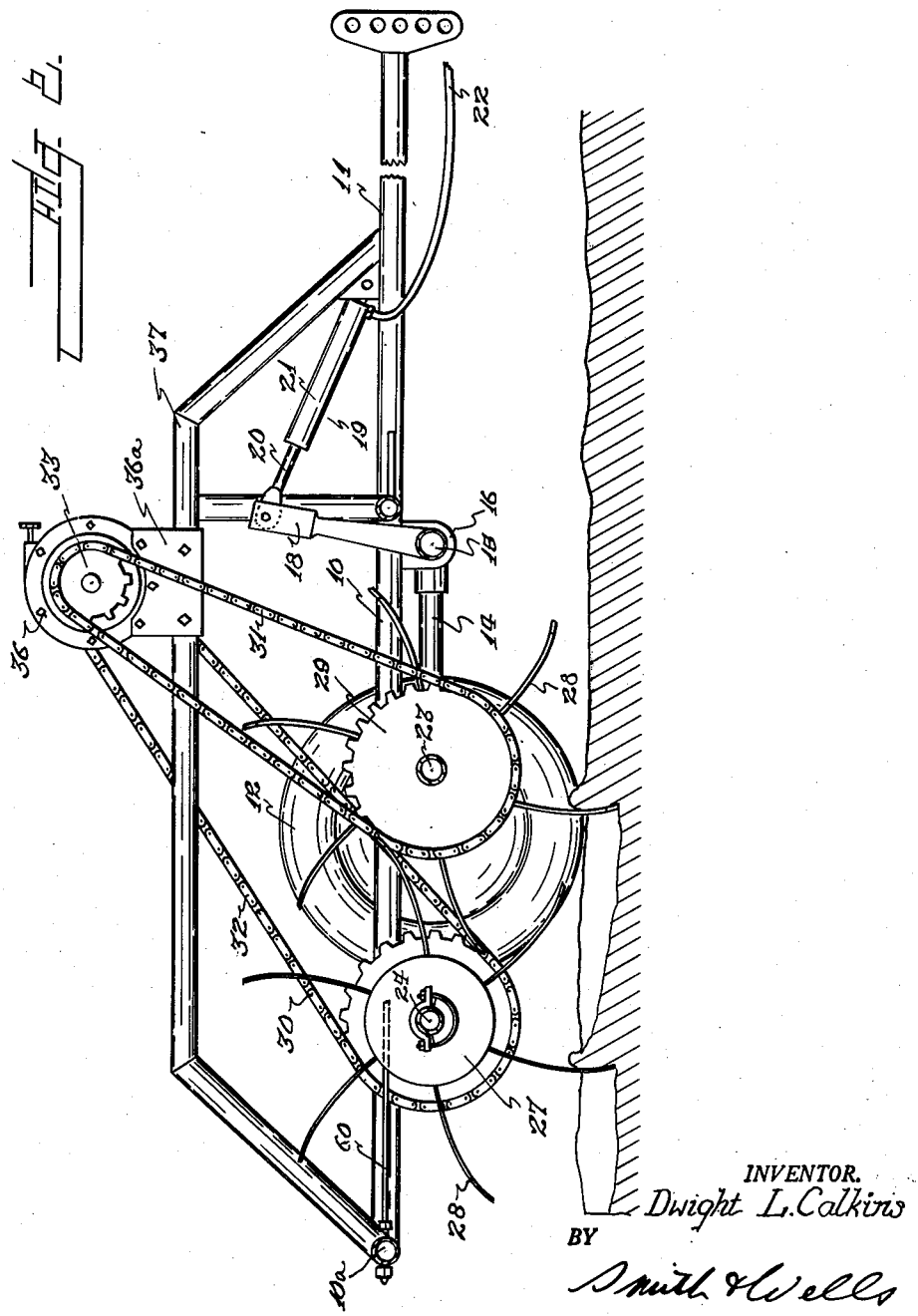

Oct. 21, 1952          D. L. CALKINS          2,614,375
REVOLVING SPRING TOOTH HARROW
Filed July 12, 1948          4 Sheets—Sheet 3
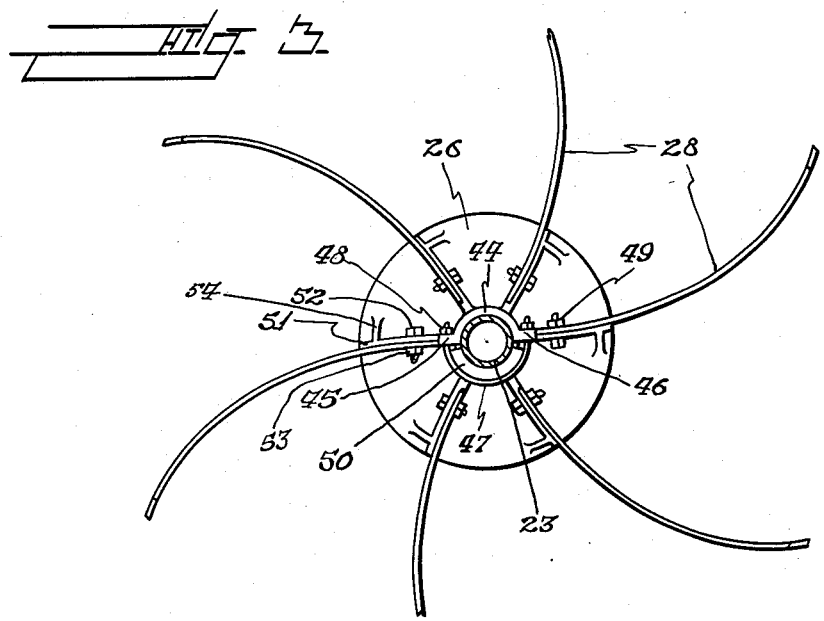
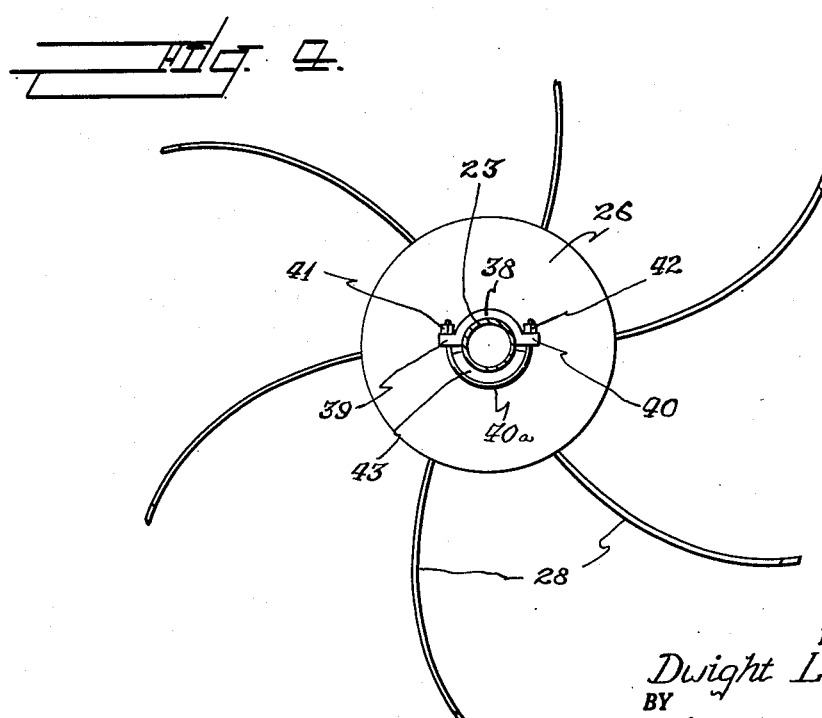
INVENTOR.
Dwight L. Calkins
BY
Smith & Wells Oct. 21, 1952  D. L. CALKINS  2,614,375
REVOLVING SPRING TOOTH HARROW
Filed July 12, 1948  4 Sheets-Sheet 4

INVENTOR.
Dwight L Calkins
BY
Smith &Wells

Patented Oct. 21, 1952

2,614,375

UNITED STATES PATENT OFFICE 2,614,375

REVOLVING SPRING TOOTH HARROW

Dwight L. Calkins, Spokane, Wash., assignor to Calkins Manufacturing Company, Spokane, Wash., a corporation of Washington Application July 12, 1948, Serial No. 38,303

3 Claims. (Cl. 55—11)

1

The present invention relates to improvements in a revolving spring tooth harrow.

Spring tooth harrows are quite widely used as a means of cultivating the soil and destroying the growth of weeds. These harrows however, present quite a problem where the trash on the soil is fairly heavy. It is desirable from the standpoint of soil conservation to keep the trash such as stubble and dead vegetation of various types, evenly distributed on the surface of the soil. This material deteriorates gradually to enrich the soil by adding humus thereto. It is particularly useful in preventing erosion since it acts to absorb rainfall and to slow down the run off of water by damming off the tiny streams which start the soil erosion. It is the purpose of the present invention to provide a novel spring tooth harrow wherein the spring teeth rotate, as they are dragged through the soil, and cleanse themselves of the trash in a steady uniform manner to leave the trash spread evenly over the soil.

More particularly it is the purpose of the present invention to provide a spring tooth harrow embodying a framework in which one or more cross shafts are rotatably mounted, the shafts having spring teeth affixed thereto in longitudinally spaced groups, each group including several teeth arranged about the shaft as a center, together with a retarding device operable to oppose rotation of the spring teeth and the shaft that would normally be caused by the teeth engaging the soil. The retarding means is of such a nature that it will retard rotation of the shaft at any desired rate. As the teeth rise out of the soil due to their rotative movement, they shed the trash individually.

It is also a purpose of this invention to provide a novel combination of rotatably mounted shafts with spring teeth thereon and additional cleansing fingers whereby the forward shaft has its spring teeth cleared of trash by the following shaft and the rearward shaft has its spring teeth cleansed of brush by fingers supported on the frame of the harrow and extending between the spring teeth.

Other and more details and objects of the invention will appear from the following description and accompanying drawings wherein a preferred form of the invention is disclosed. It should be understood however, that the drawings and description are illustrative only and should not be considered as limiting the invention except insofar as it is limited by the claims.

In the drawings:

2

Figure 1 is a plan view of a spring tooth harrow embodying my invention;

Figure 2 is a longitudinal sectional view taken substantially on the line 2—2 of Figure 1;

Figure 5:
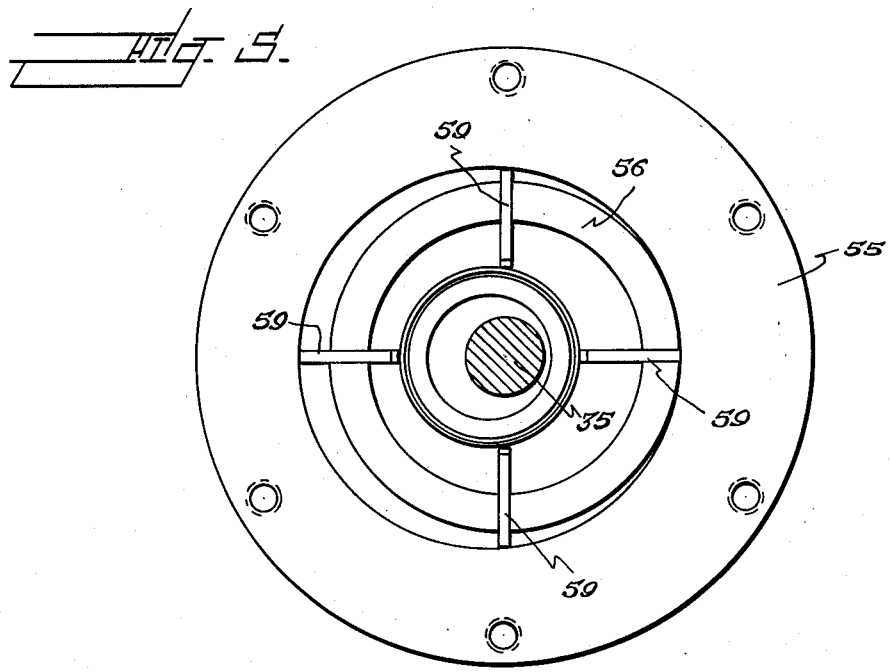
Figure 6:
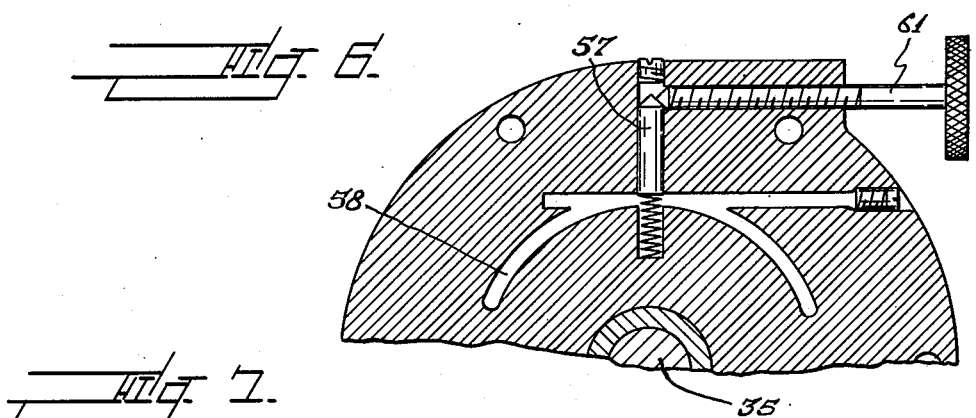
Figure 7:
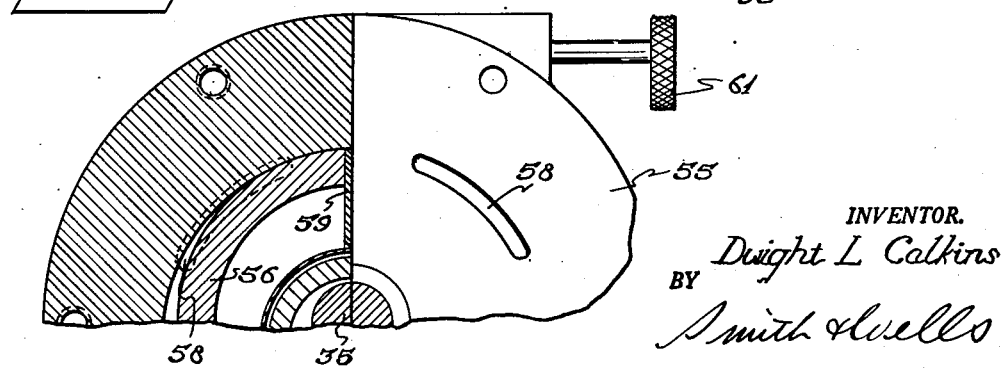

Figures 3 and 4 are enlarged fragmentary sectional views taken on the lines 3—3 and 4—4 of Figure 1; and Figures 5, 6 and 7 are detailed sectional views illustrating the inner construction of the retarding device utilized for retarding the rotation of the shafts carrying the spring teeth.

Referring now in detail to the drawings, the spring tooth harrow is composed of a rectangular frame 10 which has a draw bar 11 secured thereto for attachment to a tractor or other power vehicle. The frame 10 is supported at the proper level with respect to the ground by two wheels 12 and 13, one at each side of the frame. Each wheel is mounted upon a lever arm 14 which is fixed on a shaft 15. The shaft 15 is journalled in bearings 16 and 17 that are secured to the frame 10. Midway between the sides of the frame 10, the shaft 15 has a lever arm 18 thereon which is coupled to the frame by an hydraulic coupling 19 so that it may be adjusted to hold the frame at the proper angle with respect to the wheel lever arms to keep the frame 10 at the desired distance from the ground. The hydraulic coupling 19 preferably includes a piston 20, a cylinder 21 and a fluid supply line 22. Fluid for this hydraulic coupling may be from a source of fluid under pressure, not shown, on the tractor.

The frame 10 carries two transverse shaft 23 and 24 which are journalled in bearings not shown that are mounted to the underside of the frame. The forward shaft 23 has a series of hubs 26 secured thereto at spaced intervals between the sides of the frame 10. Likewise the rear shaft 24 has a series of hubs 27 secured thereto at spaced intervals between the sides of the frame 10. The hubs 27 on the shaft 24 are staggered with respect to the hubs 26 on the shaft 23. Each of the hubs 26 and 27 mounts several spring teeth 28. The shafts 23 and 24 are spaced apart a distance slightly greater than the radial extent of the spring teeth 28 so that the teeth carried by the shaft 23 overlap with the teeth carried by the shaft 24.

The shaft 23 has a sprocket wheel 29 fixed thereto. A similar sprocket wheel 30 is fixed on the shaft 24. These sprocket wheels are connected by sprocket chains 31 and 32 respectively to sprocket wheels 33 and 34 which are provided on the ends of a shaft 35 that is part of a retarding device 36.

The retarding device 36 is mounted by a bracket 36a on an auxiliary frame piece 37 that is spaced above the frame 10. Its function is to retard the rotation of the shafts 23 and 24 as the spring teeth 28 engage the soil. Except for this retarding device, the shafts 23 and 24 would rotate as the harrow was drawn across a field and little or no cultivation would take place. With this retarding device however, each tooth of the harrow can be made to drag through the soil a desired distance while it is turning about the shaft, in the same direction as the wheels which support the frame 10, but, at a slower rate than the wheels turn. This retarding device determines or governs the rate of rotation of the shafts 23 and 24, independently of the rate at which the harrow moves across the field.

The details of mounting the hubs 26 and 27 on their respective shafts and the mounting of the spring teeth 28 on the hubs are illustrated by Figures 5 and 6 of the drawings. Each hub comprises a disc like casting which has a projecting semi-circular seat 38 on one face thereof, the casting is apertured to receive the shaft. The seat 38 has two lugs 39 and 40 extending radially of the hub. The shaft 23 is secured to the seat 38 by an U-shaped securing member 40a, the ends of which extend through the lugs 39 and 40 and are threaded to receive nuts 41 and 42. An arcuate strip 43 is inserted between the member 40 and the shaft.

On the opposite face of the hub 26 a seat 44, similar to the seat 38 is provided. This seat 44 is also clamped to the shaft 23 by lugs 45 and 46, and U-shaped bolt 47, nuts 48 and 49 and an arcuate strip 50. This face of the hub 26 has a series of arcuate flanges 51 projecting outwardly to the rim of the hub. The spring teeth 28 are secured to the flanges 51 by a bolt 52 and a nut 53. Each flange 51 is reenforced near the rim of the hub 23 by a web 54.

The retarding device 36 is constructed similarly to the Hydraulic Power Transmission Device shown in the application of Morris W. Guyer, Serial Number 14,935, filed March 15, 1948. The shell 55 of this device is stationary while the inner element 56 mounts the shaft 35 on which the sprocket wheels 33 and 34 are located. Adjustment of the rate of retarding is accomplished by means of a hand screw 61 which advances a valve member 57 that closes a by-pass 58 around the vanes 59. The rate of flow of liquid through the by-pass determines the number of rotations of the shaft 35 per minute so long as pressure is applied by the vanes 59 on the liquid. It is believed to be unnecessary to further describe the details of this device since they are fully disclosed in the prior application referred to above. Any other adjustable retarding device for governing the rate of rotation of the shafts 23 and 24 may, if desired, be utilized. I find however, that a retarding device embodying the features of the application identified above, is particularly useful for my purpose since it provides a simple effective means for governing the rate of rotation of the spring teeth on the shafts 23 and 24 that has no braking affect on the wheels supporting the device.

The rear frame member 10a of the frame 10 also carries a series of fingers 60 which extend forwardly between the teeth on the shaft 24. These fingers serve to remove any trash that may have a tendency to cling to the spring teeth 28 on the rear shaft.

The number of spring teeth 28 on each hub may vary. Better results are obtained in shallow cultivation with a greater number of teeth. The angular spacing of the teeth should be such that, as the hub turns, the tooth that is moving down enters the soil a substantial depth before the rising tooth leaves the soil.

In operation a rotary spring tooth harrow embodying my invention has the distinct advantage that any trash caught by the teeth on the forward shaft while they are in engagement with the soil, is wiped off by the downwardly moving teeth on the rear shaft in a uniform continuous operation. Likewise the teeth on the rear shaft are caused to shed the trash continuously as they rise from the soil. In this way the trash is distributed continuously over the soil as the cultivation takes place. If the trash is bunched before harrowing, the present invention tends to spread the bunches to give a more uniform and even distribution of the trash on the surface of the soil. The wiping action of the inter-meshed spring teeth on the forward and rear shafts and the wiping action of the fingers 60 also contribute to even distribution of the trash so that it is spread over the surface after the cultivation has taken place.

It is believed that the nature and advantages of the present invention will be apparent from the foregoing description. Having thus described my invention, I claim:

1. A rotary spring tooth harrow comprising a frame, means to support the frame above the ground, means for attaching the frame to a pulling device, a shaft extending transversely of said frame and rotatably mounted thereon, spring teeth secured to said shaft, said teeth being spaced apart lengthwise and circumferentially of the shaft, whereby engagement of the teeth with the ground, as the harrow is drawn forward, exerts a force tending to turn the shaft so that the teeth in rear of the shaft rise and the teeth in front of the shaft move down, fingers on said frame to the rear of the shaft extending forwardly between laterally adjacent spring teeth, acting to strip trash from the rising teeth; and a retarding device operably connected with said shaft limiting its rotation, by said force, to a predetermined rate.

2. A rotary spring tooth harrow comprising a main frame, supports for the frame, two spaced apart shafts extending horizontally across the frame, means rotatably mounting the shafts to the frame, spring tooth mounting hubs fixed on each shaft, the hubs being spaced apart lengthwise of each shaft, the hubs on one shaft being staggered with respect to those on the adjacent shaft, spring teeth on each hub and angularly spaced about the shaft as an axis, a retarding device mounted on the frame including a shaft, means positively connecting said shaft to the first named shafts to cause the shafts to rotate in unison, and means governing the rate of rotation of said last named shaft.

3. A rotary spring tooth harrow comprising a frame, means to support the frame above the ground, means for attaching the frame to a pulling device, two shafts extending transversely of said frame and rotatably mounted thereon, spring teeth secured to each shaft, said teeth being spaced apart lengthwise and circumferentially of the shaft, whereby engagement of the teeth with the ground, as the harrow is drawn forward, exerts a force tending to turn the shaft so that the teeth in rear of the shaft rise and the teeth in front of the shaft move down, the teeth in rear of the front shaft being intermeshed with the teeth in front of the rear shaft, and a retarding device operably connected with each shaft limiting its rotation, by said force, to a predetermined rate.

DWIGHT L. CALKINS.

REFERENCES CITED

The following references are of record in the file of this patent:

UNITED STATES PATENTS

| Number | Name | Date |
|---|---|---|
| 809,716 | Miller | Jan. 9, 1906 |
| 1,301,226 | Cody | Apr. 22, 1919 |
| 1,794,011 | Geffroy | Feb. 24, 1931 |
| 1,844,255 | Kaupke | Feb. 9, 1932 |
| 2,103,116 | Peacock | Dec. 21, 1937 |

FOREIGN PATENTS

| Number | Country | Date |
|---|---|---|
| 62,520 | Denmark | July 17, 1944 |